Aug. 16, 1949.   H. W. RAMEY   2,479,257
VACUUM OPERATED GOVERNOR FOR GAS MOTORS
Filed July 29, 1946
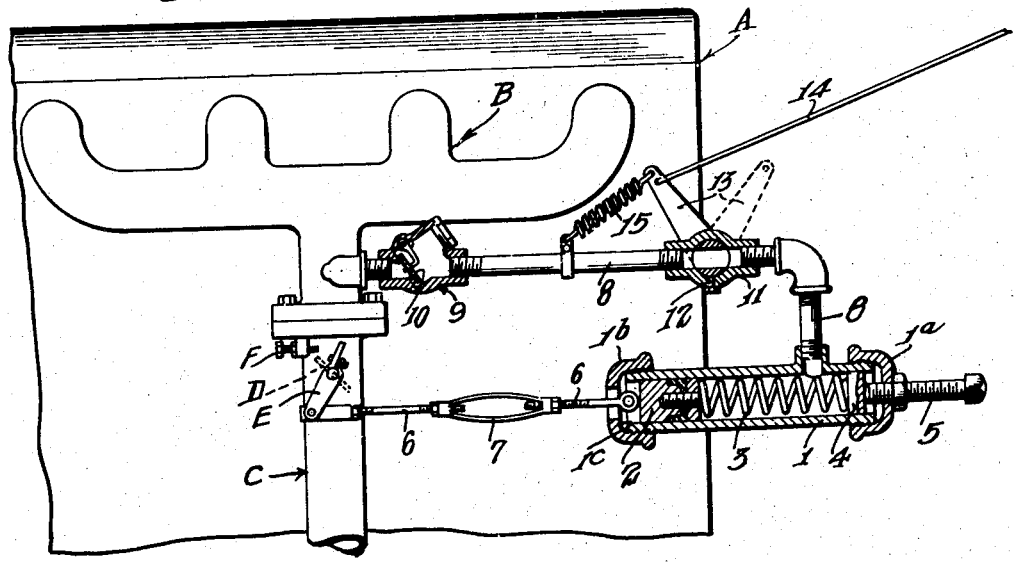
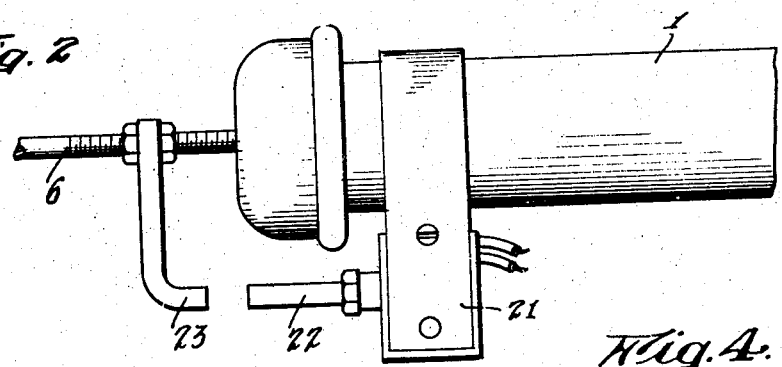
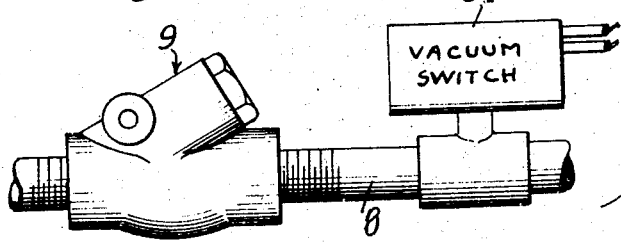
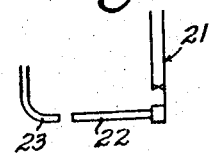
Inventor
Harold W. Ramey
By Lyon & Lyon
Attorney Patented Aug. 16, 1949

2,479,257

UNITED STATES PATENT OFFICE 2,479,257

VACUUM OPERATED GOVERNOR FOR GAS MOTORS

Harold W. Ramey, Los Angeles, Calif., assignor to C. F. Strover, Harold W. Ramey and Claude E. Brents, doing business as S. R. B. Company, Los Angeles, Calif., a partnership Application July 29, 1946, Serial No. 686,981

3 Claims. (Cl. 123—118)

My invention relates to control means for gas motors. Heretofore gas engine governors or control devices have been arranged to respond to the motor speed. That is, the governor is designed to close the throttle of a gas motor automatically when the speed exceeds a predetermined setting; however, such governor has no effect on the motor as long as its speed is below the selected speed, as a result a speed control governor is entirely unsuited in those applications, such as oil well pumping, where the gas engine is subjected to a cyclic load fluctuation.

It is a common characteristic of internal combustion gas motors of the multiple cylinder type that the power output of the engine output shaft varies with the vacuum drawn at the intake manifold. That is, when the engine is operating at a selected speed and at maximum power, the manifold pressure is high (i. e. low vacuum) while at minimum power, the manifold pressure is low (i. e. high vacuum).

Under such constant operating conditions there is a definite relationship between the throttle valve position and the power output; i. e., open position at maximum power output and almost closed at minimum power output. However, under changing conditions, as for example when the load is suddenly relieved the motor increases its speed, decreasing the manifold pressure even though the throttle valve setting remains the same.

Included in the objects of my invention are:

First, to provide a control means which makes use of the decrease or increase in manifold pressure as the load is relieved or increased to effect automatic closing or opening of the throttle valve, thereby to control the power output by throttling the fuel input in accordance with he manifold pressure; that is, to provide a control means which does not effect adjustment of the gas engine solely in accordance with a selected speed, but instead in accordance with the actual power required to move its load at the selected speed, whereby cyclic variations above and below the average constant load, as in the pumping of oil wells, being reflected in change in manifold pressure are compensated for automatically by my control means.

Second, to provide a control means which, should the load be suddenly removed, whether deliberately as by disengagement of a clutch or accidentally as by breaking of the sucker rods in a pumping well, the sudden drop in manifold pressure is utilized to throttle the gas engine to idling speed.

Third, to provide a control means of this character which may be so arranged that in the event of deliberate or accidental relief of the load, the gas engine may be automatically shut off, thus providing a control means which will automatically shut off a gas engine drive of a "shipping" pump after oil in a storage tank has been pumped into a pipeline, or if utilized on a gas engine driven well pump will automatically shut off the engine in the event the sucker rods should break.

With the above and other objects in view as may appear hereinafter, reference is directed to the accompanying drawings, in which:

Figure 1 is a partial sectional, partial elevational view of my control means for gas engines, a gas engine with its intake manifold and fuel supply line from the carburetor being shown substantially diagrammatical.

Figure 2 is an enlarged fragmentary elevational view of the vacuum cylinder and operating rod, showing a shut-off switch associated therewith.

Figure 3 is a fragmentary view of my control means wherein a vacuum switch is interposed in the vacuum line 8.

Figure 4 is a diagrammatical view showing the switch employed in Figure 2.

My control means for gas motors has, as indicated hereinbefore, particular application to the control of gas motors or engines used to operate well pumps.

In Figure 1 a gas engine A is indicated fragmentarily and diagrammatically. The gas engine includes an intake manifold B into which a fuel and air mixture is supplied from a carburetor or other device, not shown, through a duct C. Located in the duct C is a throttle valve D which is actuated by an arm E and is limited in its movement toward idling position by an adjustable stop F. My control means includes a cylinder I which contains a piston 2. The piston 2 is urged in one direction by a coil spring 3 which bears against a disk 4 the position of which is adjustable by means of a set screw 5 extending through a cap Ia covering an end of the cylinder I. The other end of the cylinder is provided with a cap Ib having a central opening and forming a shoulder Ic.

The piston 2 is joined to a connecting rod 6 which extends from the end of the cylinder opposite from the set screw 5 to the operating arm E of the throttle valve D. Interposed in the connecting rod 6 is a turnbuckle 7 so that its length may be adjusted. This adjustment of the turnbuckle 7 is utilized to regulate the maximum open position of the throttle valve D; that is, position determined by the piston 2 when it is limited by stop shoulders Ic of the cap member Ib.

A vacuum line 8 extends from the manifold B to the cylinder 1 behind or at the spring side of the piston 2. Interposed in the vacuum line 8 adjacent the manifold is a check valve 9 preferably of the disk type. The check valve is provided with a bypass port 10. Located in the vacuum line 8 between the check valve 9 and cylinder 1 is a starter valve 11 preferably in the form of a three-way valve, the third opening of which forms a bleeder port 12. The starter valve 11 is provided with an operating arm 13 which is moved in one direction by a pull wire 14 and in the opposite direction by a return spring 15.

Operation of my control means is as follows:

When starting the engine the starter valve 11 is moved to the dotted line position shown in Figure 1, in which case the cylinder 1 is isolated from the manifold and is connected to atmosphere through the bleeder port 12. After starting, the valve is returned to its solid line position. The turnbuckle 7 is adjusted so that under the normal load the throttle valve is open the requisite amount. Thus, for normal operation there will exist a substantially constant vacuum pressure in the manifold which will exert a constant force on the piston so that the throttle valve remains in its set position. Should the load be suddenly relieved, the manifold pressure will drop and the pressure in the cylinder 1 will drop at a rate determined by the bypass port 10. That is, the pressure in the cylinder 1 will lag, as it drops, behind the pressure in the manifold. This will cause the throttle to move toward its closed position, or, more accurately, to its idling position determined by the stop F.

Should the load be suddenly increased the check valve 9 opens so that the rise in manifold pressure is immediately reflected in the cylinder 1 causing the throttle valve to open rapidly and meet the new condition.

In many instances it is satisfactory that the engine merely drop to idling speed in the event the load is relieved, however, in some installations it is desirable that the engine shut off should this condition obtain. This may be accomplished by the use of a limit switch 21 mounted on the cylinder 1 and having an operating plunger 22 engageable by an operating arm 23 carried by the connecting rod 6, all as shown in Figure 2. Thus, as the throttle valve moves to its idling speed the limit switch 21 is open. By connecting this switch to the ignition of the engine the engine may be caused to shut off.

It should be observed that the adjustment between the limit switch in its operating arm may be such that the switch will only function when the load is suddenly relieved virtually in its entirety as would be the case if the engine were driving an oil well pump and the sucker rods should break.

In regard to this application of a gas engine equipped with my control means, it should be observed that there is a cyclic fluctuation in load. That is, the load may diminish as the sucker rods are lowered or raised, depending upon whether the pump is overcounterbalanced or undercounterbalanced. My control means will cause the power output of engine to decrease as the load relieves and to increase quickly as the load is increased.

In place of the limit switch 21 a vacuum switch 31 may be interposed in the vacuum line 8 and set so that it will open when the vacuum therein exceeds a predetermined value.

Many other embodiments of the invention may be resorted to without departing from the spirit of the invention.

I claim:

1. In a control means for internal combustion engines having a fuel intake manifold, a throttle valve for controlling admission of fuel to said manifold, and an ignition system, the combination of: a piston mechanically connected with said throttle valve; a cylinder for said piston; a spring operable to urge said throttle valve toward its open position; a conduit connecting said cylinder with said manifold whereby the vacuum pressure in said manifold opposes the force of said spring and tends to close said throttle valve; and an ignition switch for said ignition system adapted to be opened when the pressure in said intake manifold falls below a predetermined value thereby to shut off the engine.

2. In a control means for internal combustion engines having a fuel intake manifold, a throttle valve for controlling admission of fuel to said manifold, and an ignition system, the combination of: a piston and cylinder means; means linking said piston to said throttle valve; means connecting said cylinder to said intake manifold whereby the pressure in said cylinder reflects the pressure in said manifold and acts on said piston to move said piston in a direction to close said throttle valve as the pressure in said manifold decreases; an adjustable spring means opposing the manifold pressure against said piston; and an ignition switch and means movable with said piston to engage and open said switch when the vacuum pressure in said manifold exceeds a predetermined value thereby to shut off said engine.

3. In a control means for internal combustion engines having a fuel intake manifold, a throttle valve for controlling admission of fuel to said manifold, and an ignition system, the combination of: vacuum sensitive means communicating with said intake manifold and operatively connected with said throttle valve to move said throttle valve toward its closed position as the pressure in said intake manifold decreases and to open said throttle valve as the manifold pressure rises; an instrumentality positioned to restrict communication between said intake manifold and said vacuum sensitive means when the pressure in said manifold drops whereby the response of said vacuum sensitive means tends to lag; and an ignition switch and means responsive to manifold pressure below a predetermined value for opening said switch thereby to shut off said engine.

HAROLD W. RAMEY.

REFERENCES CITED

The following references are of record in the file of this patent:

UNITED STATES PATENTS

| Number | Name | Date |
|---|---|---|
| 1,257,776 | Allan | Feb. 26, 1918 |
| 1,709,949 | Rasmussen | Apr. 23, 1929 |
| 1,861,742 | Hand | June 7, 1932 |
| 2,062,824 | Rockwell et al. | Dec. 1, 1936 |
| 2,205,458 | Ball | June 25, 1940 |
| 2,356,679 | Mallory | Aug. 22, 1944 |

FOREIGN PATENTS

| Number | Country | Date |
|---|---|---|
| 456,336 | Germany | July 18, 1926 |
| 751,217 | France | June 12, 1933 |